United States Patent
Coleman et al.

(10) Patent No.: US 11,656,973 B2
(45) Date of Patent: May 23, 2023

(54) VISUAL DECLARATIVE DEBUGGER

(71) Applicant: International Business Machines Corporation, Armonk, NY (US)

(72) Inventors: Andrew John Coleman, Petersfield (GB); John Anthony Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/158,655

(22) Filed: Jan. 26, 2021

(65) Prior Publication Data

US 2022/0237105 A1    Jul. 28, 2022

(51) Int. Cl.
  *G06F 11/36* (2006.01)
(52) U.S. Cl.
  CPC .................. *G06F 11/3624* (2013.01)
(58) Field of Classification Search
  CPC .................................... G06F 11/3624
  USPC ............................................. 717/125
  See application file for complete search history.

(56) References Cited

U.S. PATENT DOCUMENTS

| | | | |
|---|---|---|---|
| 6,854,073 B2 | 2/2005 | Bates | |
| 7,770,155 B2 | 8/2010 | Bates | |
| 9,424,119 B2 | 8/2016 | Ercegovac | |
| 9,779,133 B2 | 10/2017 | Bhagavan | |
| 9,823,995 B2 | 11/2017 | Menahem | |
| 10,324,929 B2 | 6/2019 | Qi | |
| 2014/0245269 A1* | 8/2014 | Thukkaram et al. | G06F 11/3624 717/129 |
| 2016/0062870 A1* | 3/2016 | Menahem et al. | G06F 11/362 717/125 |
| 2019/0340103 A1* | 11/2019 | Nelson et al. | G06F 11/3624 |
| 2020/0057671 A1* | 2/2020 | Bailey et al. | G06F 9/5072 |

OTHER PUBLICATIONS

"jsonata-exerciser/src/json-parse.js," andrew-coleman prototype debugger, https://github.com/jsonata-js/jsonata-exerciser/blob/debugger/src/json-parse.js.
"53 DBMS_Debug." Database PL/SQL Packages and Types Reference, Oracle Help Center, https://docs.oracle.com/database/121/ARPLS/d_debug.htm#ARPLS009.
"JSONata Exerciser." https://try.jsonata.org/.

(Continued)

*Primary Examiner* — Wei Y Zhen
*Assistant Examiner* — Mohammed N Huda
(74) *Attorney, Agent, or Firm* — Grant Johnson

(57) ABSTRACT

According to embodiments of the present disclosure, a method of debugging datacentric programming languages, a computer program product, and a computer system. The method may comprise receiving, by a processor, an expression to be evaluated against an input data structure; evaluating, by the processor, the expression to produce an output data structure, wherein the evaluating comprises automatically augmenting the input data structure with positional metadata; receiving a user selection of a data element from a datacentric programming element; and in response to the user selection, by the processor, using the positional metadata to display a providence of the selected data element.

14 Claims, 6 Drawing Sheets

(56) References Cited

OTHER PUBLICATIONS

"Object wrapper" value types (or monkey patching getSymbol?) #464, darrencruse opened this issue on Jul. 28, 2020 • 8 comments, https://github.com/jsonata-js/jsonata/issues/464.
"Online regex tester and debugger." https://regex101.com/.
"Transact-SQL debugger", Microsoft, Jul. 22, 2020, https://docs.microsoft.com/en-us/sql/ssms/scripting/transact-sql-debugger?view=sql-server-ver15.
"What is Distributed Tracing?" https://opentracing.io/docs/overview/what-is-tracing/.
"Advanced Interrogative Debugger for data-centric domain," Apr. 13, 2013, IPCOM000226865D, IP.com.
Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

```
JSONata Exerciser                    ⚙ 🔖 ↻ ✻ 🗑 😀

{                                        $sum(Account.Order>product.(Price * Quantity))  ← 522
  "Account": {
    "Account Name": "Firefly",
                                         520 →
    "Order": [
      {
        "OrderID": "order103",                                        530 →
        "Product": [
          {
            "Product Name": "Bowler Hat",
            "ProductID": 858383,
            "SKU": "0406654608",
            "Description": {
              "Colour": "Purple",
              "Width": 300,           ← 512
              "Height": 200,
              "Depth": 210,
              "Weight": 0.75
            },
            "Price": 34.45, ← 512'                  336.36 ← 532, 532'
            "Quantity": 2
          },
          {
            "Product Name": "Trilby hat",
            "ProductID": 858236,
            "SKU": "0406634348",
            "Description": {
              "Colour": "Orange",
              "Width": 300,           ← 512
              "Height": 200,
              "Depth": 210,
              "Weight": 0.6
            },
            "Price": 21.67, ← 512'
            "Quantity": 1
          }
        ]

JSON ▤                                               JSONata
[Invoice ∨]                                          [1.8.4 ∨]
```

FIG. 5

VISUAL DECLARATIVE DEBUGGER

STATEMENT REGARDING PRIOR DISCLOSURES BY THE INVENTOR OR A JOINT INVENTOR

The following disclosure(s) are submitted under 35 U.S.C. 102(b)(1)(A):
  (i) "Prototype Debugger," published Aug. 20, 2020 at https://github.com/j sonata-js/jsonata-exerciser/blob/debugger/src/json-parse.js; and
  (ii) "Comment to 'object wrapper' value types (or monkey patching getSymbol?) #464," at https://github.com/jsonata-js/jsonata/issues/464,
which are available herewith as Computer Program Listing Appendices A and B.

BACKGROUND

The present disclosure relates to systems for software development, and more specifically, to systems for debugging software.

The development of the EDVAC system in 1948 is often cited as the beginning of the computer era. Since that time, computer systems have evolved into extremely complicated devices. Modern computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

A significant part of the software development process is finding and fixing errors, or "bugs," that cause undesired results during the execution of the program. The process of locating, analyzing, and correcting those bugs is commonly known as "debugging."

Debugging programs may be done manually or interactively. In manual debugging, the programmer may personally trace through the instructions that comprise the program, as well as monitor the contents of its various memory elements, e.g., registers and variables. In the interactive debugging, the program under development may be executed under the control of a helper program (known as a "debugger"), which may automatically perform the instruction tracing and may automatically track the contents of its memory elements, leaving the programmer free to focus on the program's logical flow. The debugger may be located on and executed by the same computer system on which the program is executed or may be located on a different system from the one the program is executed on, such as in the case of a distributed debugger.

SUMMARY

According to embodiments of the present disclosure, a method of debugging datacentric programming languages. The method may comprise receiving, by a processor, an expression to be evaluated against an input data structure; evaluating, by the processor, the expression to produce an output data structure, wherein the evaluating comprises automatically augmenting the input data structure with positional metadata; receiving a user selection of a data element from a datacentric programming element; and in response to the user selection, by the processor, using the positional metadata to display a providence of the selected data element.

According to embodiments of the present disclosure, a computer program product for a datacentric programming language debugger. The computer program product ma comprise a computer readable storage medium having program instructions embodied therewith. The program instructions may be executable by a processor to cause the processor to receive an expression to be evaluated against an input data structure, evaluate the expression to produce an output data structure, cross reference the individual data elements with one or more entries in the input data structure, receive a user selection of a data element from a datacentric programming element, wherein the datacentric programming element is chosen from the group consisting of the input data structure, the output data structure, and the expression, trace the selected data element to a location within the datacentric programming element, and track the selected data element through evaluation of the expression. The program instructions may also cause the processor, to in response to the user selection, use the positional metadata to display a providence of the selected data element and visually present to the user, without using a breakpoint, information indicating how the input data structure is processed. The evaluating may comprise automatically augmenting the input data structure with positional metadata. The positional metadata may comprise positional information of individual data elements in the output data structure. The positional metadata may comprise a unique identifier associated with each of a plurality of elements in the input data structure.

According to embodiments of the present disclosure, a computer system for debugging datacentric programming languages. The system comprising a processor configured to execute instructions that, when executed on the processor, cause the processor to receive an expression to be evaluated against an input data structure, evaluate the expression to produce an output data structure, wherein the evaluating comprises automatically augmenting the input data structure with positional metadata, receive a user selection of a data element from a datacentric programming element, and in response to the user selection, use the positional metadata to display a providence of the selected data element.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is an example display screen from a display editor, consistent with some embodiments.

Figure 1:
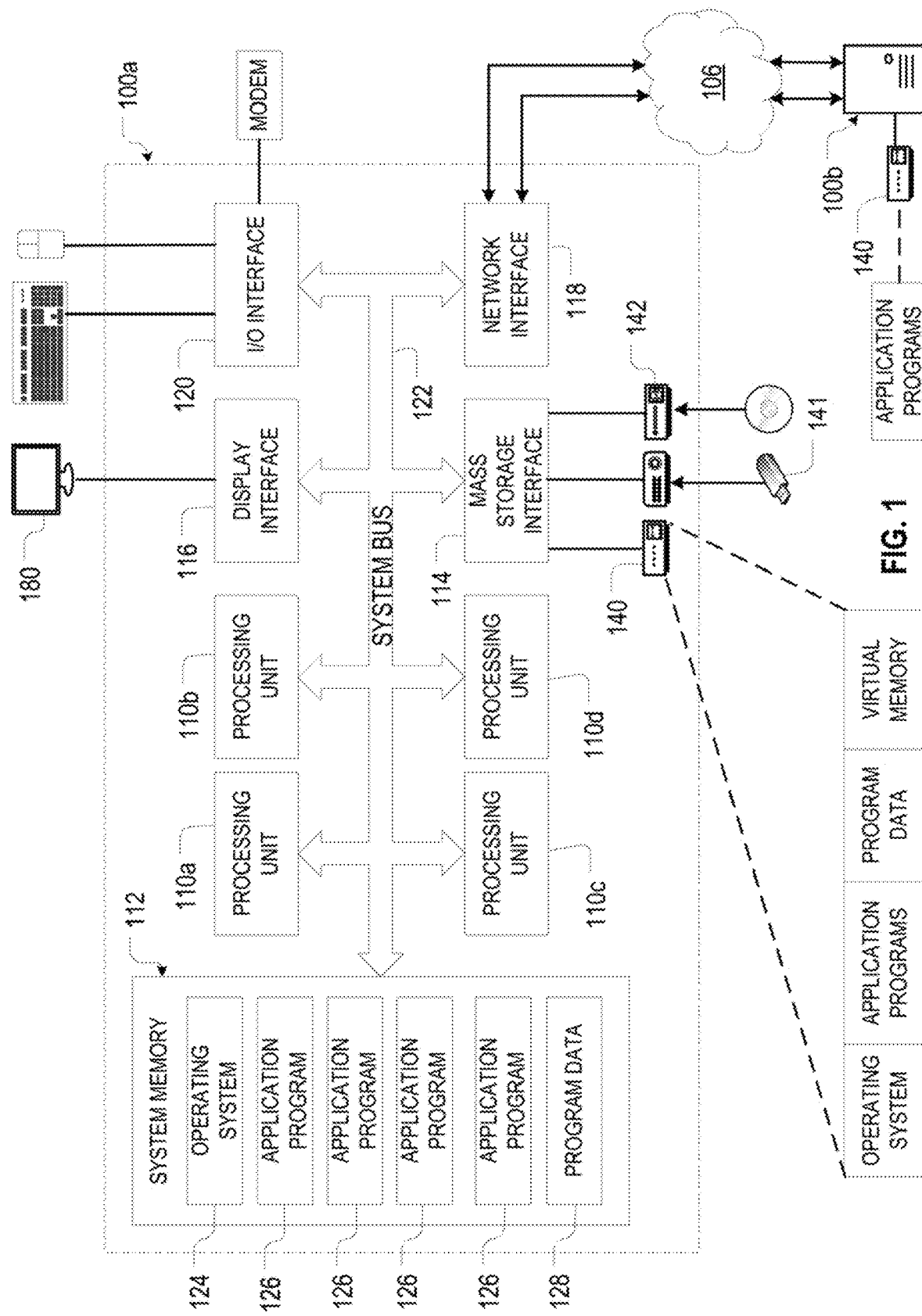
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems for software development; more particular aspects relate to systems for debugging software. While the present disclosure is not necessarily limited to such applications, various aspects of the disclosure may be appreciated through a discussion of various examples using this context.

Datacentric programming, such as declarative programming languages (e.g., the JSONata query and transformation language for JavaScript Object Notation ("JSON") data, the XML Path Language ("Xpath") for Extensible Markup Language (XML) data, etc.) and declarative software applications, may be used to process structured input data. For example, datacentric programs may read elements from one or more input tables, perform one or more operations on those elements, and then generate one or more formatted output tables. The operations may include various table processing operations (e.g., create, read, update, and delete), along with the common relational operations on tables, such as selection (i.e., picking one or more rows of a table based on a condition), projection (i.e., selecting a set of fields), join (i.e., associating rows of two tables), group-by (i.e., combining table rows by keys), and sort (i.e., filtering and organizing rows of table based on conditions), etc.

Datacentric programming may often use three or more types of variables, including: "scalar variables" containing integer/string type of data; "structure variables" containing a list of field-value pairs; and "tables" containing rows and columns of ordered data. In some of these types, the position of individual data elements within the structure and/or the position of rows and columns within a table may encode additional relationships. Additionally, the output of datacentric programs may be presented in a tabular layout. In these embodiments, an observation about the output may carry the location context of whether it is at a column, row, or cell level.

As with other types of programs, an unexpected observation in the output of the program, in value, in location, or both, may indicate a bug exists in datacentric programs. Based on the nature of the observation, typical faults in data-centric domain may include: (i) incorrect cell entry; (ii) an entire column, corresponding to all rows, has incorrect values; (iii) one or more missing rows; (iv) one or more unwanted rows; (v) no output; and (vi) exceptions. Additionally, bugs may be observed at intermediate program points in the execution. For example, an output of an execution occurrence for a function, a complex data-processing operation, or a table writing statement may be undesired. While considering faults at intermediate program points in the execution, an input variable's value may become the starting point of a bug detection and correction.

Although debugging imperative programming languages has a number of well-established techniques (e.g., the setting of breakpoints in the code, stepping over statements, stepping into/out of functions and viewing the values of variable bindings), these techniques are not useful for datacentric programming because the datacentric programmer uses the syntax of an element of program code to describe the desired result, rather than the steps that the computer needs to take to achieve that result. Accordingly, some embodiments may include systems and methods to help debug declarative languages by parsing and augmenting the input data (e.g., tables, XML, JSON documents, etc.) with positional metadata such that, after an operation (e.g., a query) has been processed, the resulting output values can be traced back to the associated location(s) within the original input structure. These embodiments may, in turn, enable more efficient debugging of datacentric programs, where the flow of data from input to output may be an important aspect of the debugging process.

Some embodiments may generate the positional metadata during a serialization stage of the output data (e.g., the result), including positional information of individual data elements in the output that can be cross referenced with individual elements from the input data. This may allow a visual debugging tool to display the providence of selected data elements through to the resulting output (e.g., some embodiments may color code, or otherwise highlight, the specific data elements in the input data structure that were used to generate a particular element in the output data structure responsive to a particular operation). These embodiments may help the developer conclude that a particular operation (e.g., query expression) is selecting the correct parts of the input structure and/or give clues as to where the particular operation is going wrong if that operation returns unexpected results.

Some embodiments may include a language processor that can emit trace events as each clause within the expression and/or program is processed. These trace events may contain positional information of the clause, references to the input and output values and their metadata, and/or the result of evaluating that clause within the overall expression. These trace events can be aggregated and correlated with the positional metadata from the parse and serialize operations described above. This, in turn, may allow embodiments display extra information showing how the expression was applied to the input and output data.

One feature and advantage of some embodiments is the ability to efficiently present the conversion of input data to output data to a programmer/user when applying a declarative query language. Some embodiments of the disclosure may advantageously apply this feature and advantage to the integration space to help with debugging an entire integration flow. For example, an integration flow may be made up of a series of declarative language requests to external systems followed by mapping the results (often using additional declarative language statements) to other structures, which, in turn, can be used for requests to still other external systems. In this example application, some embodiments may enable debugging of the full integration flow, because the data fields that comprise the results from each request can be tracked throughout the entire flow. Embodiments with a visual debugger may, additionally and at any point, be able to track the output data in a structure back to its original source. For another example, consider an integration flow that receives an internet (e.g., a hypertext transfer protocol, or http) request, transforms it to a call to a first enterprise software system followed by a call to a second enterprise software system. Using a debugger consistent with some embodiments, a user/programmer can select a data field in the input request, and then see where that field ends up in the corresponding requests to the first and second enterprise software systems.

Additionally, some embodiments may highlight, or otherwise visually identify, corresponding elements in the input data, output data, and operational statement. This may allow the user/programmer to visually inspect those highlighted fields, wherever they are used in other data structures in the integration flow. As such, these embodiments may provide a feature analogous to adding a dye to water entering a drain and seeing where the same color dye appears further downstream. Moreover, as compared to just matching input strings between data structures, if a value "5" is selected in one structure by the user/programmer, then all other structures that have the value "5" will not necessary be highlighted in some embodiments. Instead, only "5"s that originate from the exact "5" data field in the original message will be highlighted in these embodiments. This feature and advantage may further help when trying to understand how data is flowing through an integration flow.

Additionally, while some embodiments of the disclosure have generally been described with reference to datacentric programming languages, the disclosure is not limited to that application. For example, some embodiments may be applied to high level engineering modeling and design platforms, statistical computing packages, engineering equation solvers, parametric computer aided design packages, etc., in which the user manipulates high level logical constructs to define a desired result, rather than to directly generate a set of low-level program instructions. Similarly, embodiments of the disclosure may be applied to database management systems to help develop and debug queries.

Data Processing System

FIG. 1 illustrates an embodiment of a data processing system (DPS) 100a, consistent with some embodiments. The DPS 100a in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100a, and individual components may have greater complexity than represented in FIG. 1.

The data processing system 100a in FIG. 1 comprises a plurality of central processing units 110 a-110 d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100a to communicate with other DPS 100b over the communications medium 106. The memory 112 also contains an operating system 124, a plurality of application programs 126, and program data 128.

The data processing system 100a embodiment in FIG. 1 is a general-purpose computing device. Accordingly, the processors 110 may be any device capable of executing program instructions stored in the memory 112 and may themselves be constructed from one or more microprocessors and/or integrated circuits. In this embodiment, the DPS 100a contains multiple processors and/or processing cores, as is typical of larger, more capable computer systems; however, in other embodiments the data processing system 100a may comprise a single processor system and/or a single processor designed to emulate a multiprocessor system. Further, the processors 110 may be implemented using a number of heterogeneous data processing systems 100a in which a main processor is present with secondary processors on a single chip. As another illustrative example, the processor 110 may be a symmetric multi-processor system containing multiple processors of the same type.

When the data processing system 100a starts up, the associated processor(s) 110 initially execute the program instructions that make up the operating system 124, which manages the physical and logical resources of the DPS 100a. These resources include the memory 112, the mass storage interface 114, the terminal/display interface 116, the network interface 118, and the system bus 122. As with the processor(s) 110, some DPS 100a embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 1, the instructions are stored in a functional form of persistent storage on the direct access storage device 140. These instructions are then loaded into the memory 112 for execution by the processor 110. However, the program code may also be located in a functional form on the computer readable media that is selectively removable and may be loaded onto or transferred to the DPS 100a for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 1 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100a to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS, such as DPS 100b.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units 180, which may include monitors or the like, to the data processing system 100a. These display units 180 may be non-intelligent (i.e., dumb) terminals, such as an LED monitor, or may themselves be fully programmable workstations used to allow IT administrators and customers to communicate with the DPS 100a. Note, however, that while the display interface 116 is provided to support communication with one or more display units 180, the data processing system 100a does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100a, 100b. Accordingly, the network interfaces 118 can be any device that facilitates such communication, regardless of whether the network connection is made using present day analog and/or digital techniques or via some networking mechanism of the future. Suitable communications medium 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Cloud Computing

Figure 2:
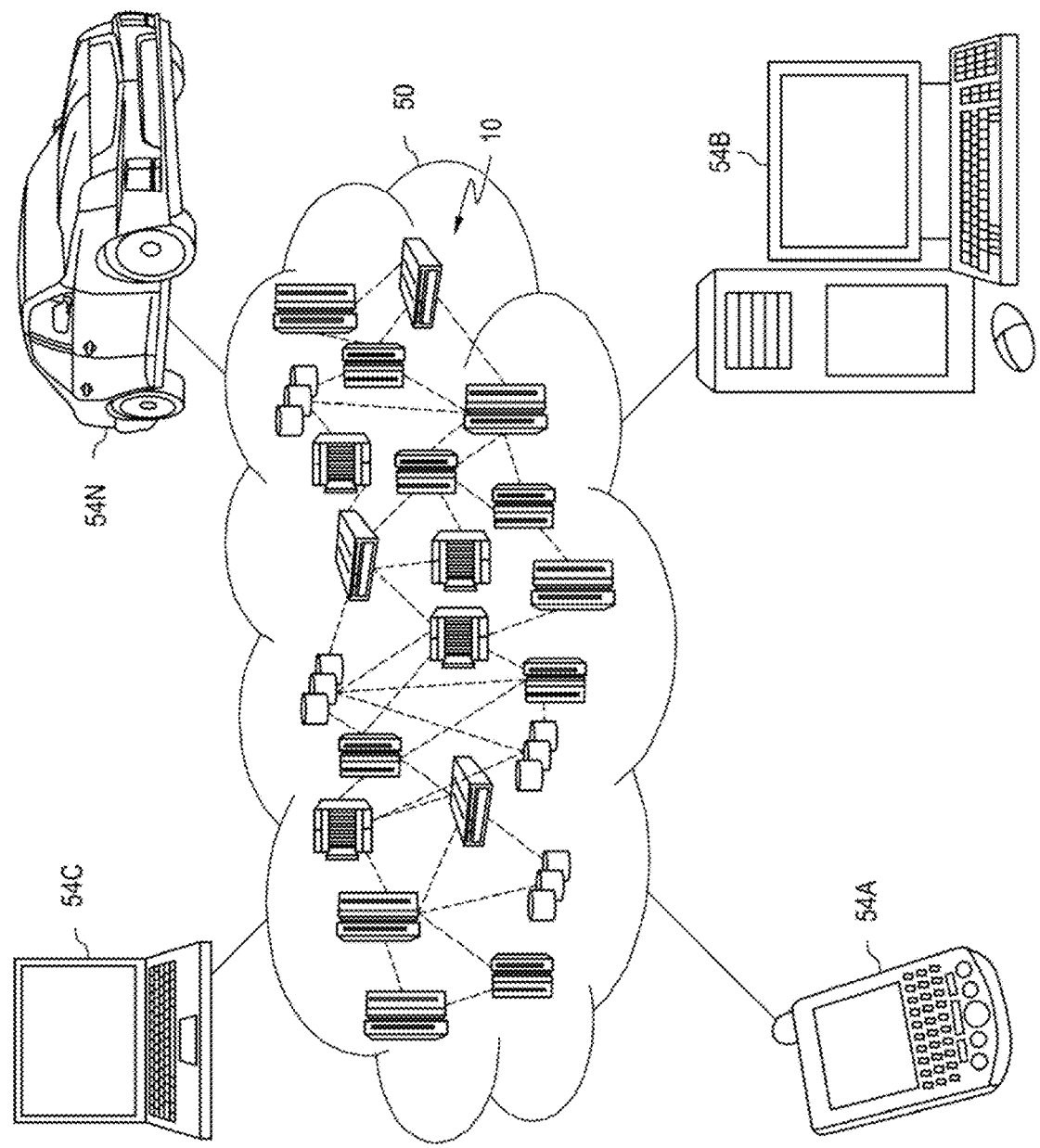
FIG. 2 depicts a cloud computing environment, consistent with some embodiments.

FIG. 2 illustrates a cloud environment containing one or more DPS 100a, 100b consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
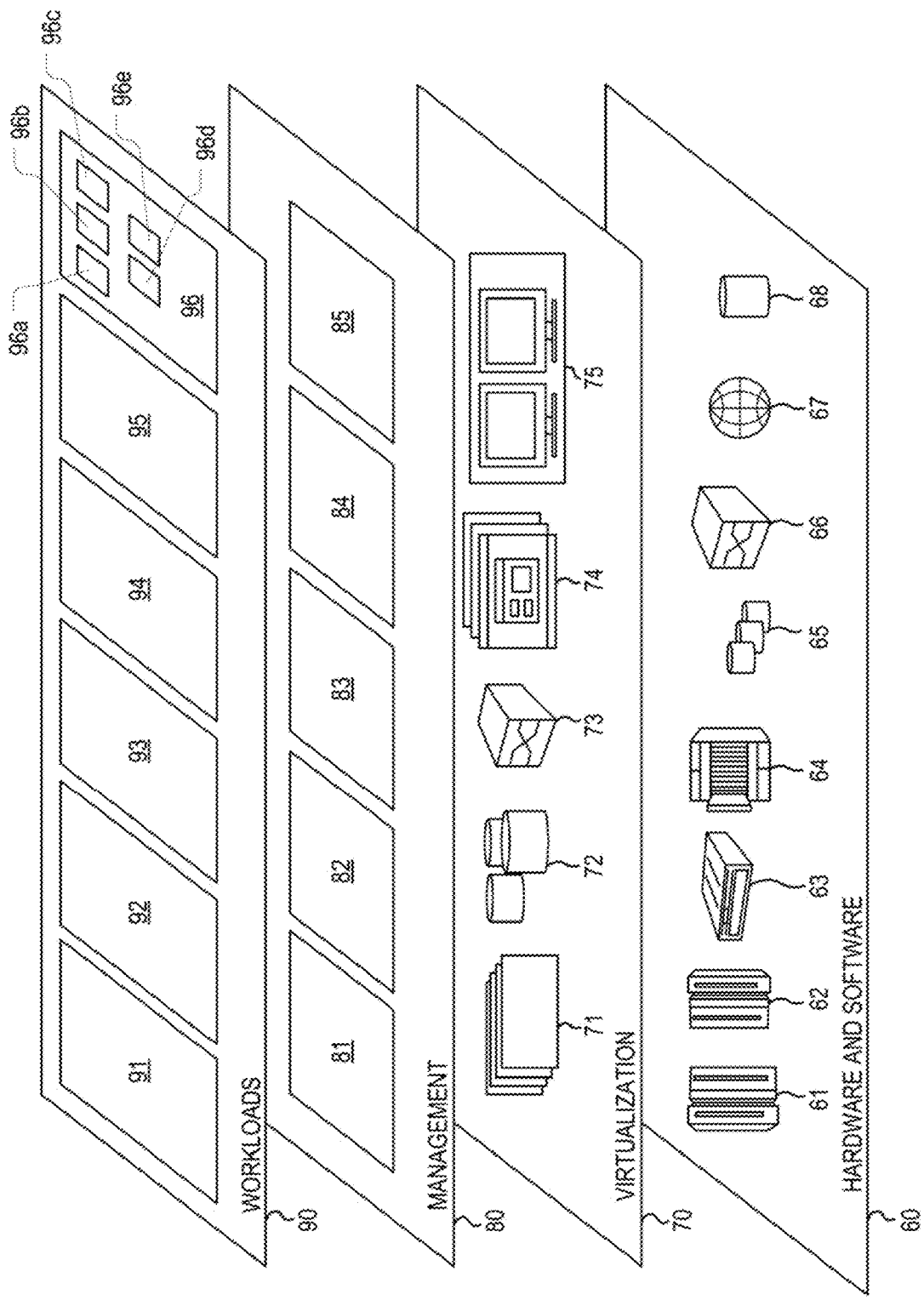
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a software development environment 96. The software development environment 96, in turn, may comprise a JSON parser 96a, an expression processor 96b, a JSON serializer 96c, a visual editor 96d, and a language compiler 96e.

Debugger Application

Figure 4A:
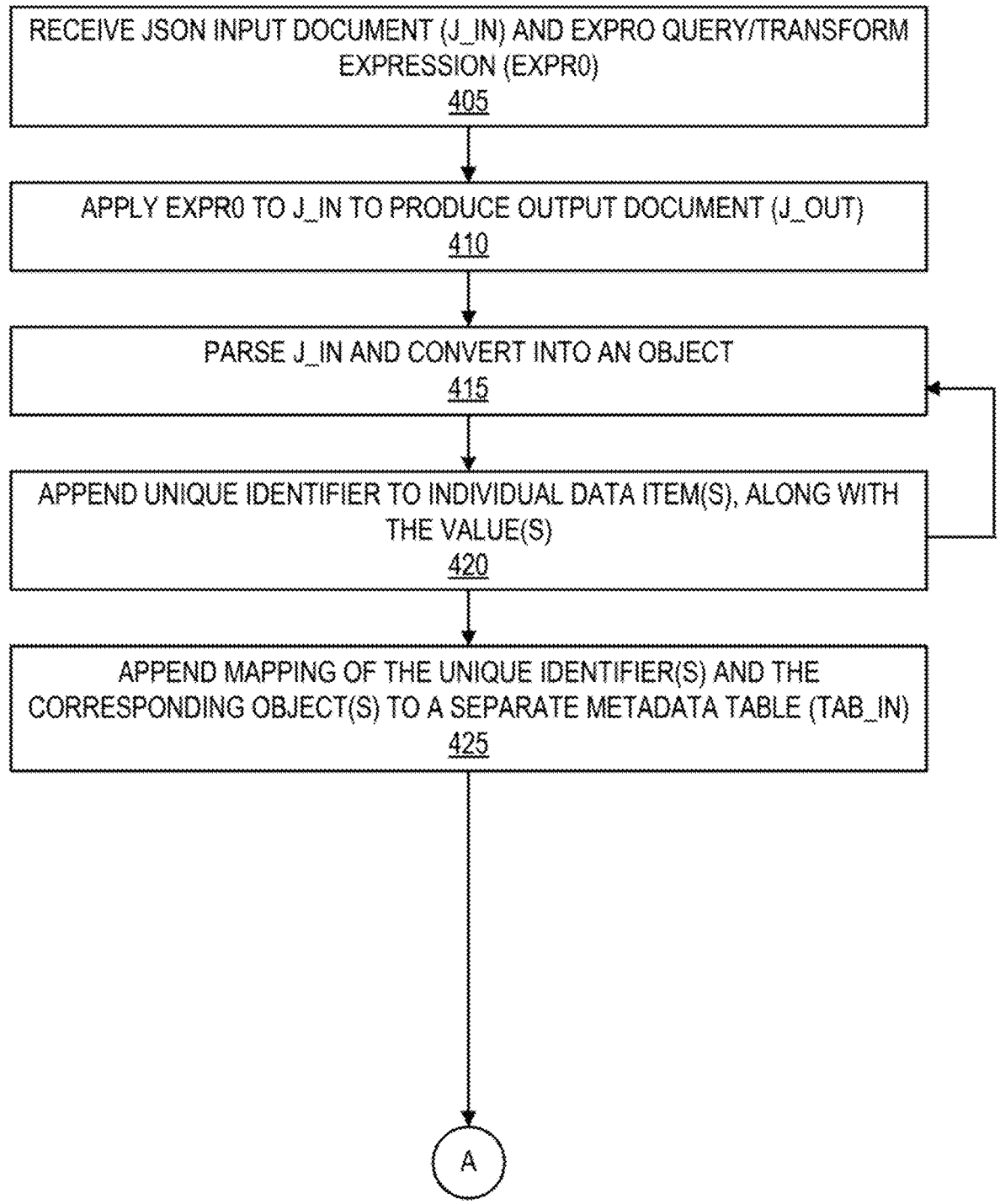
FIGS. 4A-4B (collectively FIG. 4) are parts of a flow chart showing a software development suite in operation, consistent with some embodiments.
Figure 4B:
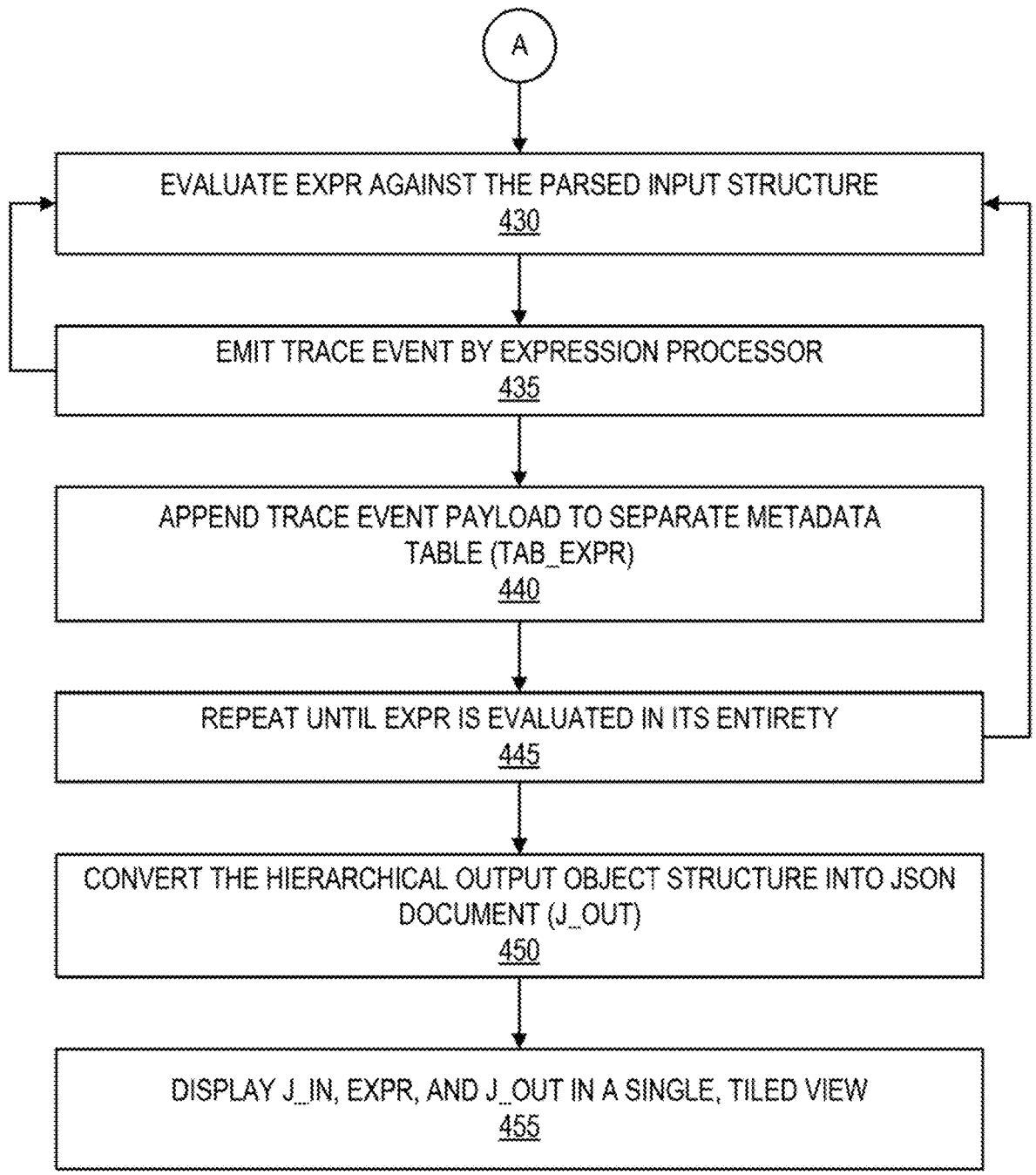

FIGS. 4A-4B (collectively FIG. 4) are portions of a flow chart showing the software development environment 96 in operation, consistent with some embodiments. The embodiment in FIG. 4 is described with reference to the JSONata declarative JSON query and transformation language, available under the terms of the MIT License from Jsonata.org, but embodiments may equally be applied to other datacentric programming languages and/or data formats (e.g., XPath, XQuery, XSLT for processing XML data, structured query language (SQL) queries for databases, etc.) The software development environment 96 in FIG. 4 may be executed using a computing node 10 located within a cloud environment 50, which in turn may comprise one or more DPS 100a.

At operation 405, the software development environment 96 may receive a JSON input document (J_IN) and an original query/transform expression (EXPR0) from the user/programmer. As illustrative example, J_IN may comprise:

TABLE 1

```
{
"Account": {
"Account Name": "Firefly",
"Order": [
    {
        "OrderID": "order103",
        "Product": [
            {
                "Product Name": "Bowler Hat",
                "ProductID": 858383,
                "SKU": "0406654608",
                "Description": {
                    "Colour": "Purple",
                    "Width": 300,
                    "Height": 200,
                    "Depth": 210,
                    "Weight": 0.75
                },
                "Price": 34.45,
                "Quantity": 2
            },
            {
                "Product Name": "Trilby hat",
                "ProductID": 858236,
                "SKU": "0406634348",
                "Description": {
                    "Colour": "Orange",
                    "Width": 300,
                    "Height": 200,
                    "Depth": 210,
                    "Weight": 0.6
                },
                "Price": 21.67,
                "Quantity": 1
            }
        ]
    },
]
****
```

At operation 410, the original expression EXPR0 may be applied to J_IN to produce a resultant output JSON document (LOUT). Continuing the illustrative example, the EXPR0 may comprise:

TABLE 2

$sum(Account.Order.Product.(Price * Quantity))
and the output may comprise:

TABLE 3

336.36

Next, in the operations 415-420 loop, the JSON parser 96a may be invoked to parse J_IN line-by-line and convert it into an object. As each individual data item is encountered during the loop, a unique identifier (e.g., a monotonically incrementing integer) may be appended to, or otherwise stored in, the parsed object representing that item, along with the value itself. The resulting object may comprise a hierarchy of name/value pairs, where the values may be any of the data types allowed the language, such as: String, Number, Boolean, Object, Array, and Null. The "Array" type, in turn, may contain an ordered list of values of any of these types, and the "Object" type may contain name/value pairs in a recursive manner. Continuing the illustrative example, the result of operations 415-420 may comprise:

TABLE 4

```
function parseValue( ) {
    let token = scanner.next( );
    let result;
    const start = scanner.pos( );
    switch (token.type) {
        case '{': // it's an object
            result = { };
            // next token MUST be a string or'}'
            let next = scanner.next('string','}');
            while (next.type !== '}') {
                const key = next.value;
                // next token MUST be a colon
                next = scanner.next(':');
                // then get the value
                result[key] = parseValue( );
                // next token MUST be a ',' or '}'
                next = scanner.next(',','}');
                if (next.type === ',') {
                    next = scanner.next('string');
                }
            }
            idIndex.push({start: start, end: scanner.pos( )+1});
            Object.defineProperty(result, '__jsonata__id',{
                value: id++
            });
            break;
        case '[': // it's an array
            result = [ ];
            let value = parseValue( );
            while (typeof value !== 'undefined') {
                result.push(value);
                const next = scanner.next(',',']');
                if (next.type === ']') {
                    break;
                }
                value = parseValue( );
            }
            idIndex.push({start: start, end: scanner.pos( )});
            Object.defineProperty(result, '__jsonata__id', {
                value: id++
            });
            break;
        case 'string':
            result = new String(token.value);
            idIndex.push(token.position);
            Object.defineProperty(result, '__jsonata__id', {
                value: id++
            });
            break;
****
``` where "value: id++" may generate the unique identifier in this illustrative example. Next, a mapping of the unique identifier(s) and the corresponding object(s) may be appended to, or otherwise stored in, a separate metadata table (TAB_IN) at operation 425.

The expression processor 96b may evaluate the expression EXPR against the parsed input structure in the operations 430-435 loop. The expression processor 96b may be instructed according to an Abstract Syntax Tree (AST) representation of the EXPR as built by the language compiler 96e in some embodiments. Each element within the AST may represent a particular language clause within the expression in accordance with the language's grammar. As each clause is evaluated, a trace event may be emitted by the expression processor 96b. In some embodiments, each trace event may contain, at minimum, a position of that clause within EXPR and the resultant value(s) produced by that clause. If that value is extracted from the input structure (parsed from LIN), then it may contain the unique identifier that was injected by the parser 96a. The trace event payload may be appended to a separate metadata table (TAB_EXPR) at operation 440 in some embodiments.

Operations 430-445 may repeat until the expression EXPR is evaluated in its entirety. Depending on the expression, zero or more data items may be selected from the input, processed, and added to the output. The output may, depending on the expression, be a hierarchy of values in some embodiments. If individual values in the output have been selected from individual values in the input, then some embodiments may preserve their corresponding unique identifiers along with the value.

The JSON serializer 96c may be invoked at operation 450 to convert the hierarchical output object structure into a JSON document (J_OUT). The JSON serializer 96c in some embodiments may traverse the object structure and may append, or otherwise store, the serialized form of each data item to J_OUT according to the JSON format specification. As each item is encountered, if it has an identifier property associated with it, then this identifier, together with the position of this serialized item in LOUT, may be appended to a separate metadata table (TAB_OUT). The display editor 96d may display the input data (LIN), expression (EXPR), and result data (J_OUT) in a single, tiled view at operation 455.

FIG. 5 is an example display screen 500 from a display editor 96d, consistent with some embodiments. The display screen 500 in FIG. 5 comprises an input pane (e.g., J_IN) 510, an original query/transform input pane (e.g., EXPR0) 520, and an output pane (e.g., J_OUT) 530. The input pane 510 may display a plurality of ordered data elements 512 (only some labeled for clarity). The query/transform input pane 520 may comprise an expression 522 to be evaluated against one or more of the ordered data elements 512. The output pane 530 may comprise the result data 532 of the evaluation of the expression 522 against the ordered data elements 512.

The user of the display editor 96d can interact with its various elements and panes, such as by:
(1) Clicking on individual elements of the result data 532'. The display editor 96d may capture the position of the click within the result pane 530, and translate it into an offset position within J_OUT. The table TAB_OUT may then be searched to find an entry that is contains at that position. If found, the associated unique identifier may be extracted and used to lookup the position of the corresponding input data elements(s) 512' from TAB_IN. These cross-correlated positions between the output and input can be highlighted in the input and output panes 510 and 530.
(2) Clicking on individual elements of the input data elements 512'. The display editor 96d may capture the position within the input document that was clicked, and translate it into an offset position within J_IN. The table TAB_IN may be searched to find an entry that contains that position. If found, the associated unique identifier(s) may be extracted and used to lookup the positions of any associated output data value(s) from TAB_OUT (there can be zero or more associated output data values). These cross-correlated positions between the input value and possible multiple output values may be highlighted in the input and output panes 510 and 530 (e.g., 512' and 532').
(3) Clicking on individual clauses within the expression 522. The display editor 96d may capture the position within the expression that was clicked and translate it into an offset position within EXPR. The table TAB_EXPR may be searched to find any entries that contain this position, and there can be zero or more entries. The value(s) associated with each entry may be extracted directly from the input J_IN, in which case, will also contain the unique identifier(s). This information can be used to highlight the corresponding values in the input Pane 510 using the method in (1) above, and/or the corresponding values in the output pane 530 using the method in (2) above.

Other methods of presenting the correlated data items, and other display screen 500 configurations, are also consistent with some embodiments of the disclosure.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

Computer Program Listing Appendix A: "Prototype Debugger"

Computer Program Listing Appendix B: "Comment to 'object wrapper' value types (or monkey patching getSymbol?) #464"

What is claimed is:

1. A method of debugging datacentric programming languages, comprising:
   receiving, by a processor, an expression to be evaluated against an input data structure;
   evaluating, by the processor, the expression to produce an output data structure, wherein the evaluating comprises automatically augmenting the input data structure with positional metadata;
   receiving a user selection of a data element from a datacentric programming element wherein the data element is chosen from the group consisting of the input data structure, the output data structure, and the expression;
   tracing the selected data element to a location within the datacentric programming element;
   tracking the selected data element through evaluation of the expression; and
   in response to the user selection, by the processor:
      using the positional metadata to display a providence of the selected data element; and
      visually presenting to the user, without using a breakpoint, information indicating how the input data structure is processed.

2. The method of claim 1, wherein the input data structure comprises an XML document and wherein the expression comprises a XPath expression.

3. The method of claim 1, wherein the input data structure comprises a JSON document and wherein the expression comprises a JSONata expression.

4. The method of claim 1, wherein the input data structure comprises a database and wherein the expression comprises an SQL expression.

5. The method of claim 1, further comprising tracing the selected data element to a location within the datacentric programming element.

6. The method of claim 1, wherein the positional metadata comprises positional information of individual data elements in the output data structure, the method further comprising cross referencing the individual data elements with the one or more entries in the input data structure.

7. The method of claim 1, wherein the positional metadata comprises a unique identifier associated with each of the one or more input data elements in the input data structure.

8. The method of claim 1, further comprising tracking the selected data element through evaluation of the expression.

9. A computer program product for a datacentric programming language debugger, comprising, a computer readable storage medium having program instructions embodied therewith, the program instructions executable by a processor to cause the processor to:
receive an expression to be evaluated against an input data structure;
evaluate the expression to produce an output data structure, wherein:
the evaluating comprises automatically augmenting the input data structure with positional metadata;
the positional metadata comprises positional information of individual data elements in the output data structure; and
the positional metadata comprises a unique identifier associated with each of a plurality of elements in the input data structure;
cross reference the individual data elements with one or more entries in the input data structure;
receive a user selection of a data element from a datacentric programming element, wherein the datacentric programming element is chosen from the group consisting of the input data structure, the output data structure, and the expression;
trace the selected data element to a location within the datacentric programming element;
track the selected data element through evaluation of the expression; and
in response to the user selection:
use the positional metadata to display a providence of the selected data element; and
visually present to the user, without using a breakpoint, information indicating how the input data structure is processed.

10. A computer system for debugging datacentric programming languages, the system comprising a processor configured to execute instructions that, when executed on the processor, cause the processor to:
receive an expression to be evaluated against one or more input data elements in an input data structure;
evaluate the expression to produce one or more output data elements in an output data structure from the one or more input data elements, wherein the evaluating comprises automatically augmenting the input data structure with positional metadata;
receive a user selection of a data element from a datacentric programming element, wherein the data element is chosen from the group consisting of the one or more input data elements, the one or more output data elements, and the expression;
tracing the selected data element to a location within the datacentric programming element;
tracking the selected data element through evaluation of the expression; and
in response to the user selection:
use the positional metadata to display a providence of the selected data element; and
visually present to the user, without using a breakpoint, information indicating how the input data structure is processed.

11. The computer system of claim 10, further comprising instructions that, when executed on the processor, cause the processor to trace the selected data element to a location within the datacentric programming element.

12. The computer system of claim 10, wherein the positional metadata comprises positional information of individual data elements in the output data structure; and further comprising instructions that, when executed on the processor, cause the processor to cross reference the individual data elements with the one or more input data elements in the input data structure.

13. The computer system of claim 10, wherein the positional metadata comprises a unique identifier associated with each of the one or more input data elements in the input data structure.

14. The computer system of claim 10, further comprising instructions that, when executed on the processor, cause the processor to track the selected data element through evaluation of the expression.

* * * * *